(12) United States Patent
Wang et al.

(10) Patent No.: US 11,200,877 B2
(45) Date of Patent: Dec. 14, 2021

(54) FACE MASK FOR FACILITATING CONVERSATIONS

(71) Applicant: LENOVO (Singapore) PTE. LTD., New Tech Park (SG)

(72) Inventors: Mengnan Wang, Chapel Hill, NC (US); Song Wang, Cary, NC (US); Hong Xiong, Raleigh, NC (US); Jatinder Kumar, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/844,868

(22) Filed: Apr. 9, 2020

(65) Prior Publication Data

US 2021/0319777 A1 Oct. 14, 2021

(51) Int. Cl.
*G10K 11/178* (2006.01)
*H04W 4/80* (2018.01)
*H04R 1/08* (2006.01)

(52) U.S. Cl.
CPC ............ *G10K 11/178* (2013.01); *H04R 1/08* (2013.01); *H04W 4/80* (2018.02); *G10K 2210/108* (2013.01); *H04R 2420/07* (2013.01)

(58) Field of Classification Search
CPC . G10K 11/178; G10K 2210/108; H04W 4/80; H04R 1/08; H04R 2420/07
USPC .................... 381/71.1, 77, 91, 124
See application file for complete search history.

(56) References Cited

U.S. PATENT DOCUMENTS

| | | | |
|---|---|---|---|
| 2010/0322442 A1* | 12/2010 | Namm | H04R 1/08 381/122 |
| 2011/0093262 A1* | 4/2011 | Wittke | G10K 11/17885 704/226 |
| 2012/0082329 A1* | 4/2012 | Neumeyer | H04R 25/65 381/314 |
| 2013/0050258 A1 | 2/2013 | Liu et al. | |
| 2017/0080262 A1* | 3/2017 | Freres | A62B 18/025 |
| 2018/0239425 A1 | 8/2018 | Jang | |
| 2018/0286351 A1* | 10/2018 | Fateh | G06Q 30/0641 |
| 2019/0346678 A1 | 11/2019 | Nocham | |

* cited by examiner

*Primary Examiner* — William A Jerez Lora
(74) *Attorney, Agent, or Firm* — Kunzler Bean & Adamson (57) ABSTRACT

Apparatuses, systems, devices, and methods for a face mask for facilitating conversations are disclosed. A face mask includes a microphone located on an inside of the face mask, a processor located on the inside of the face mask and connected to the microphone, and a memory located on the inside of the face mask that stores code executable by the processor. The code is executable by the processor to capture, using the microphone, audio spoken by a user wearing the face mask, determine a mode that the face mask is in for transmitting the captured audio to a destination, and transmit the captured audio to the destination based on the determined mode.

20 Claims, 5 Drawing Sheets

FACE MASK FOR FACILITATING CONVERSATIONS

FIELD

The subject matter disclosed herein relates to face masks and more particularly relates to face masks for facilitating conversations.

BACKGROUND

Face masks can be worn to avoid pollution, prevent contracting and spreading diseases, as fashion items, to protect a person's face, or the like. It may be difficult to hear or understand what someone who is wearing a face mask is saying because the user's voice can be muffled due to the face mask. In addition, it may be difficult for electronic devices to hear or understand voice commands. Consequently, a user who is wearing a mask may speak louder to be heard through the face mask, which exposes conversations that are intended to be private to the public.

BRIEF SUMMARY

Apparatuses, systems, devices, and methods for a face mask for facilitating conversations are disclosed. A face mask, in one embodiment, includes a microphone located on an inside of the face mask, a processor located on the inside of the face mask and connected to the microphone, and a memory located on the inside of the face mask that stores code executable by the processor. In one embodiment, the code is executable by the processor to capture, using the microphone, audio spoken by a user wearing the face mask, determine a mode that the face mask is in for transmitting the captured audio to a destination, and transmit the captured audio to the destination based on the determined mode.

A method, in one embodiment, includes capturing, using a microphone located on an inside of a face mask, audio spoken by a user wearing the face mask. In certain embodiments, a method includes determining a mode that the face mask is in for transmitting the captured audio to a destination. In further embodiments, a method includes transmitting the captured audio to the destination based on the determined mode.

A system, in one embodiment, includes a face mask. The face mask, in one embodiment, includes a microphone located on an inside of the face mask, a processor located on the inside of the face mask and connected to the microphone, and a memory located on the inside of the face mask that stores code executable by the processor. In one embodiment, the code is executable by the processor to capture, using the microphone, audio spoken by a user wearing the face mask, determine a mode that the face mask is in for transmitting the captured audio to a destination, and transmit the captured audio to the destination based on the determined mode. In one embodiment, the system includes an application executing on an electronic device. In certain embodiments, the electronic device is communicatively coupled to the face mask. In certain embodiments, the application is operable to control one or more settings of the face mask.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

The description of elements in each figure may refer to elements of proceeding figures. Like numbers refer to like elements in all figures, including alternate embodiments of like elements.

A face mask, in one embodiment, includes a microphone located on an inside of the face mask, a processor located on the inside of the face mask and connected to the microphone, and a memory located on the inside of the face mask that stores code executable by the processor. In one embodiment, the code is executable by the processor to capture, using the microphone, audio spoken by a user wearing the face mask, determine a mode that the face mask is in for transmitting the captured audio to a destination, and transmit the captured audio to the destination based on the determined mode.

In one embodiment, the face mask includes a speaker located on an outer surface of the face mask, the speaker operably coupled to the processor. In certain embodiments, the code is executable by the processor to cause the speaker to output noise cancelling sounds in response to the face mask being in a private mode.

In one embodiment, the face mask includes a wireless network component that is operably coupled to the processor. The destination for the captured audio may be an electronic device that is communicatively coupled to the network component. In certain embodiments, the code is executable by the processor to transmit the captured audio to the electronic device over a data network in response to the face mask being in the private mode.

In one embodiment, the data network includes a short-range wireless communication network, the short-range wireless communication network comprising a communication protocol selected from the group consisting of Bluetooth®, near-field communication, and Wi-Fi.

In one embodiment, the speaker is the destination for the captured audio in response to the face mask being in a public mode, the code executable by the processor to cause the speaker to output the audio captured from the user. In certain embodiments, the face mask includes one or more sensors on the outer surface of the face mask for detecting one or more people within a proximity of the face mask.

In one embodiment, the code is executable by the processor to deactivate the speaker in response to detecting no people within the proximity of the face mask and to activate the speaker in response to detecting at least one person within the proximity of the face mask. In one embodiment, the face mask further includes a physical switch for changing the mode of the face mask between a private mode, a public mode, and an on/off mode.

In one embodiment, the face mask is made of a soundproof material so that audio spoken by the user while wearing the mask is not audible external to the mask. In further embodiments, the face mask includes one or more proximity sensors located on the inside of the face mask. In one embodiment, the code is executable by the processor to deactivate the processor in response to detecting that the user is not wearing the face mask based on input from the one or more proximity sensors and to activate the processor in response to detecting that the user is wearing the face mask.

A method, in one embodiment, includes capturing, using a microphone located on an inside of a face mask, audio spoken by a user wearing the face mask. In certain embodiments, a method includes determining a mode that the face mask is in for transmitting the captured audio to a destination. In further embodiments, a method includes transmitting the captured audio to the destination based on the determined mode.

In one embodiment, the method includes causing a speaker located on an outer surface of the face mask to output noise cancelling sounds in response to the face mask being in a private mode. In further embodiments, the destination for the captured audio is an electronic device that is communicatively coupled to a network component of the face mask. The captured audio may be transmitted to the electronic device over a data network in response to the face mask being in the private mode.

In one embodiment, the method includes deactivating the speaker in response to detecting no people within a proximity of the face mask based on input captured from one or more sensors located on the outer surface of the face mask. In some embodiments, the method includes activating the speaker in response to detecting at least one person within the proximity of the face mask based on input captured from the one or more sensors located on the outer surface of the face mask.

In one embodiment, a speaker located on an outer surface of the face mask is the destination for the captured audio, the captured audio transmitted to the speaker in response to the face mask being in a public mode. In further embodiments, the method includes deactivating the processor in response to detecting that the user is not wearing the face mask based on input from one or more proximity sensors located inside the mask and activating the processor in response to detecting that the user is wearing the face mask based on input from the one or more proximity sensors located inside the mask.

A system, in one embodiment, includes a face mask. The face mask, in one embodiment, includes a microphone located on an inside of the face mask, a processor located on the inside of the face mask and connected to the microphone, and a memory located on the inside of the face mask that stores code executable by the processor. In one embodiment, the code is executable by the processor to capture, using the microphone, audio spoken by a user wearing the face mask, determine a mode that the face mask is in for transmitting the captured audio to a destination, and transmit the captured audio to the destination based on the determined mode. In one embodiment, the system includes an application executing on an electronic device. In certain embodiments, the electronic device is communicatively coupled to the face mask. In certain embodiments, the application is operable to control one or more settings of the face mask.

In one embodiment, the code is executable by the processor to cause the speaker to output noise cancelling sounds in response to the face mask being in a private mode. In certain embodiments, the face mask further comprises a wireless network component that is operably coupled to the processor and in communication with the electronic device.

In one embodiment, the destination for the captured audio is the electronic device. In some embodiments, the code is executable by the processor to transmit the captured audio to the electronic device over a data network in response to the face mask being in the private mode. In one embodiment, the one or more settings includes one or more of a mode of the mask, a volume of the speaker, and a sensitivity of the microphone.

Figure 1:
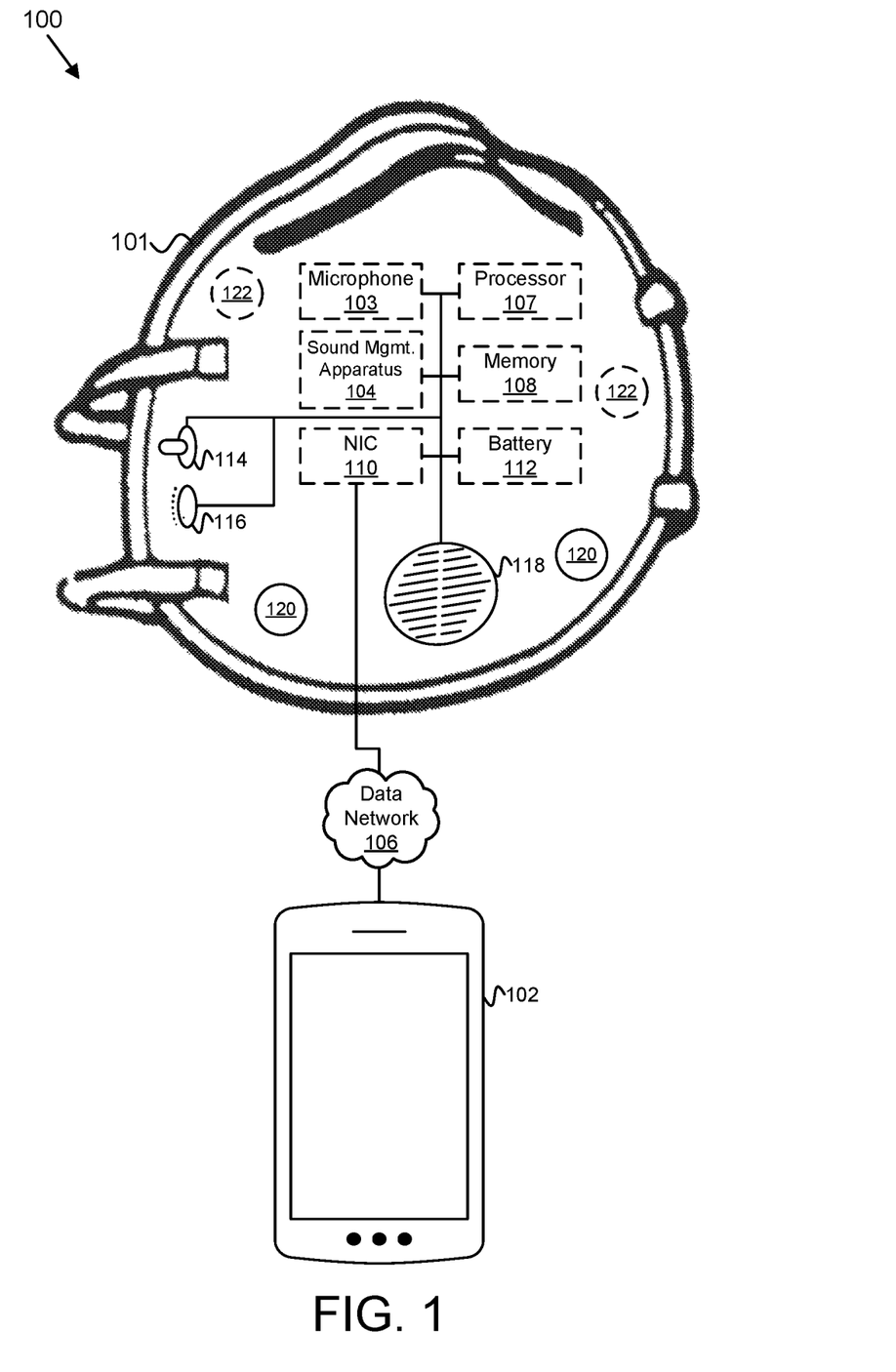
FIG. 1 is a schematic block diagram illustrating one embodiment of a face mask for facilitating conversations.

FIG. 1 is a schematic block diagram illustrating one embodiment of a system 100 for a face mask 101. A face mask 101, as used herein, may comprise a face covering, typically over the mouth and/or nose but may cover the entire face/head, that may help prevent the wearer from spreading and/or inhaling airborne toxins, bacteria, droplets, virus particles, and/or the like. Examples of face masks 101 may include surgical face masks, procedure masks, medical masks, respirators (e.g., N95 or FFP masks), and/or other masks as part of personal protective equipment. Other masks may include Halloween masks, ski masks, sports masks, masks for hazmat or decontamination suits, scuba masks, and/or the like.

In one embodiment, the face mask 101 is made of a soundproof material so that audio spoken by the user while the user is wearing the face mask 101 is not audible or understandable external to or outside the face mask 101. The material may include one or more portions of acoustic foam material, sound insulation (e.g., mineral wool, rock wool, fiberglass, or the like), acoustic fabrics, acoustic coatings, cork, felt, polymers, polyester material, and/or the like.

In one embodiment, the system 100 includes one or more information handling devices 102 that are communicatively coupled to the face mask 101. The information handling devices 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In one embodiment, the face mask 101 includes various electronic components to facilitate communications from the mask wearer. The face mask 101, in certain embodiments, includes a microphone 103 for capturing audio that is spoken by the mask wearer. The microphone 103 may be any type of microphone 103 that is sensitive enough to detect and capture the wearer's speech and has a form factor that allows it to fit on the inside of the face mask 101. Multiple microphones 103 may be placed on an inner surface of the face mask 101 to capture audio within the face mask 101 such as the wearer's speech.

In one embodiment, the face mask 101 includes a sound management apparatus 104. The sound management apparatus 104, in one embodiment, is configured to capture, using the microphone 103, audio spoken by a user wearing the face mask 101, determine a mode that the face mask 101 is in for transmitting the captured audio to a destination, and transmit the captured audio to the destination based on the determined mode. For instance, the destination may be speaker 118 while the face mask 101 is in a public mode and the destination may be an information handling device 102 while the face mask 101 is in a private mode. The sound management apparatus 104 is described in more detail below with reference to FIGS. 2 and 3.

In one embodiment, the sound management apparatus 104 may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like.

In one embodiment, the sound management apparatus 104 may be mounted on a printed circuit board with one or more electrical lines or connections (e.g., to volatile memory, a non-volatile storage medium, a network interface, a peripheral device, a graphical/display interface, or the like). The printed circuit board may include one or more pins, pads, or other electrical connections configured to send and receive data (e.g., in communication with one or more electrical lines of a printed circuit board or the like), and one or more hardware circuits and/or other electrical circuits configured to perform various functions of the sound management apparatus 104.

The face mask 101 may be communicatively coupled to an electronic device 102 via a data network 106. The data network 106, in one embodiment, includes a digital communication network that transmits digital communications. The data network 106 may include a (short-range) wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

In one embodiment, the face mask 101 includes a processor 107, which may be a microprocessor, an FPGA, an ASIC, and/or other programmable logic hardware, and a memory 108 that stores instructions, executable code, firmware, and/or the like for execution by the processor 107. The memory 108 may be a random access memory ("RAM"), a read-only memory ("ROM"), an erasable programmable read-only memory ("EPROM" or Flash memory), and/or the like.

In one embodiment, the face mask 101 includes a network controller 110 such as a wireless network card ("NIC"). The MC 110 may be configured to communicate wirelessly with an electronic device of the data network 106. The NIC 110 may be configured to wireless communicate over a Bluetooth® connection, an NFC connection, a Wi-Fi connection, and/or the like.

The face mask 101, in further embodiments, includes a power source that includes a battery 112. The battery 112 may be a rechargeable battery, a replaceable battery, and/or the like. The battery 112 may be configured to provide power to the various components of the face mask 101, e.g., the processor, memory, MC 110, sound management apparatus 104, speaker 118, sensors 120/122, and/or the like. Other power sources may be used such as solar panels, or the like.

In one embodiment, the face mask 101 includes a physical switch/button 114 that is configured change the modes of the face mask 101. The modes, in one embodiment, include a public mode or a private mode, which may be changed by toggling the switch/button 114. The switch 114 may further be configured to turn the face mask 101 on/off (e.g., by holding the switch/button 114 down for a predefined period of time, by pressing the switch/button 114 in a certain pattern (press five times in a row, one long press and two short presses, and/or the like). Additionally, the face mask 101 may include a physical volume control 116 that controls the volume of the speaker 118. In certain embodiments, a mobile application may execute on the electronic device 102 to control the mode, the speaker volume, a sensitivity of the microphone 103, and/or other settings of the face mask 101.

In one embodiment, the speaker 118 is located on an outer surface of the face mask 101 and is configured to broadcast sound captured from within the face mask 101, e.g., the user's speech so that the user is easier to hear while speaking wearing the face mask 101. In further embodiments, the face mask 101 includes sensors 120 located on the outside of the face mask 101. The sensors 120 may be configured to detect the presence of objects such as other people, a proximity to those objects, and/or the like. The sensors 120 may include proximity sensors, motion sensors, infrared sensors, and/or the like. Furthermore, the face mask 101 may include sensors 122 on the inside of the face mask 101. The sensors 122 may be configured to detect whether the face mask 101 is being worn or not. The sensors 122 may include proximity sensors, motion sensors, infrared sensors, and/or the like.

Figure 2:
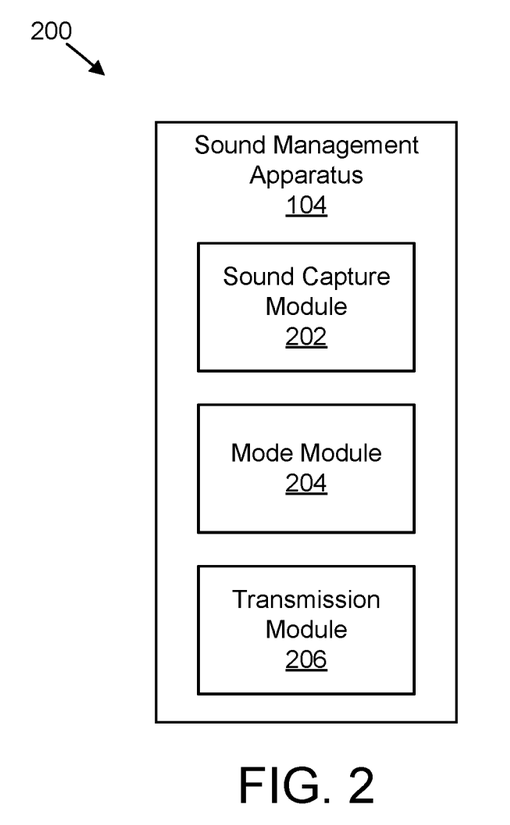
FIG. 2 is a schematic block diagram illustrating one embodiment of an apparatus for a face mask for facilitating conversations.

FIG. 2 depicts a schematic block diagram illustrating one embodiment of an apparatus 200 for a face mask for facilitating conversations. In one embodiment, the apparatus 200 includes an instance of a sound management apparatus 104. The sound management apparatus 104, in one embodiment, includes one or more of a sound capture module 202, a mode module 204, and a transmission module 206, which are described in more detail below.

The sound capture module 202, in one embodiment, is configured to capture, using a microphone 103, audio spoken by a user wearing the face mask 101 depicted in FIG. 1. As explained above, the microphone 103 may be located on the inner surface of a face mask 101 and may be configured to capture audio from within the face mask 101 while the face mask 101 is being worn.

The audio may be audible speech that the user speaks while the user is wearing the face mask 101. The microphone 103 may be positioned on the inner surface of the face mask 101 to be in an optimal position to capture the user's speech, e.g., proximate to a user's mouth position. Multiple microphones 103 may be located on the inner surface of the face mask 101 to capture a full range of the user's speech.

The mode module 204, in one embodiment, is configured to determine a mode that the face mask 101 is in for transmitting the captured audio to a destination. In one embodiment, the mode comprises a private mode or a public mode. In the private mode, as explained below, the audio that the microphone captures may be transmitted to an electronic device 102 such that the captured audio is not audible outside of the face mask 101, e.g., to the general public. In the public mode, as explained below, the audio that the microphone captures is transmitted to the speaker 118 and broadcast outside the face mask 101, e.g., broadcast to the general public.

In one embodiment, the mode module 204 is communicatively coupled to the switch 114 on the face mask 101 and receives signals from the switch 114 that indicate whether the face mask 101 is in a public or private mode. For instance, the mode module 204 may receive a signal, flag, bit, or the like that the switch/button 114 generates when it is actuated between a public mode and a private mode.

In some embodiments, if the mode module 204 detects that the face mask 101 is communicatively coupled to an electronic device 102, the mode module 204 may default to a private mode. In such an embodiment, a user may temporarily switch the mode from private to public mode by actuating the button/switch 114 while speaking (e.g., similar to a walkie-talkie), or may permanently switch the mode from private to public mode by actuating the switch 114 for a predetermined period of time, in a certain pattern (e.g., pressing two times, one short press and one long press, and/or the like), and/or the like. In further embodiments, if the face mask 101 is disconnected from the electronic device 102, the face mask 101 may automatically be placed in a public mode.

In certain embodiments, when the mode is switched between private and public modes, the mode module 204 may provide feedback via the speaker 118 to indicate to the user that the mode has changed. The feedback may include voice feedback, e.g., a voice command such as "mode changed to public mode," tone feedback, e.g., a beep, and/or the like.

The transmission module 206, in one embodiment, is configured to transmit the captured audio to the destination based on the determined mode. In one embodiment, if the face mask 101 is in a private mode, the destination may be one or more electronic devices 102 that are communicatively connected to the face mask 101. For instance, if the mode module 204 determines that the face mask 101 is in a private mode, the transmission module 206 may send the captured audio, e.g., the user's voice, to a smart phone that is connected to the face mask 101 over a Bluetooth® connection.

In certain embodiments, if the face mask 101 is in a public mode, the destination is the speaker 118 such that the audio captured from within the face mask 101 is broadcast from the speaker away from the face mask 101. For instance, if the mode module 204 determines that the face mask 101 is in a public mode, the transmission module 206 may send the captured audio, e.g., the user's voice, to the speaker 118. In such an embodiment, the user may control the volume of the speaker using the volume control 116.

In certain embodiments, a mobile application executing on the electronic device 102 may be configured to control various features of the face mask 101, including the mode that the face mask 101 is in, e.g., public/private, turning the face mask on/off, controlling the volume of the speaker 118, and/or the like.

Figure 3:
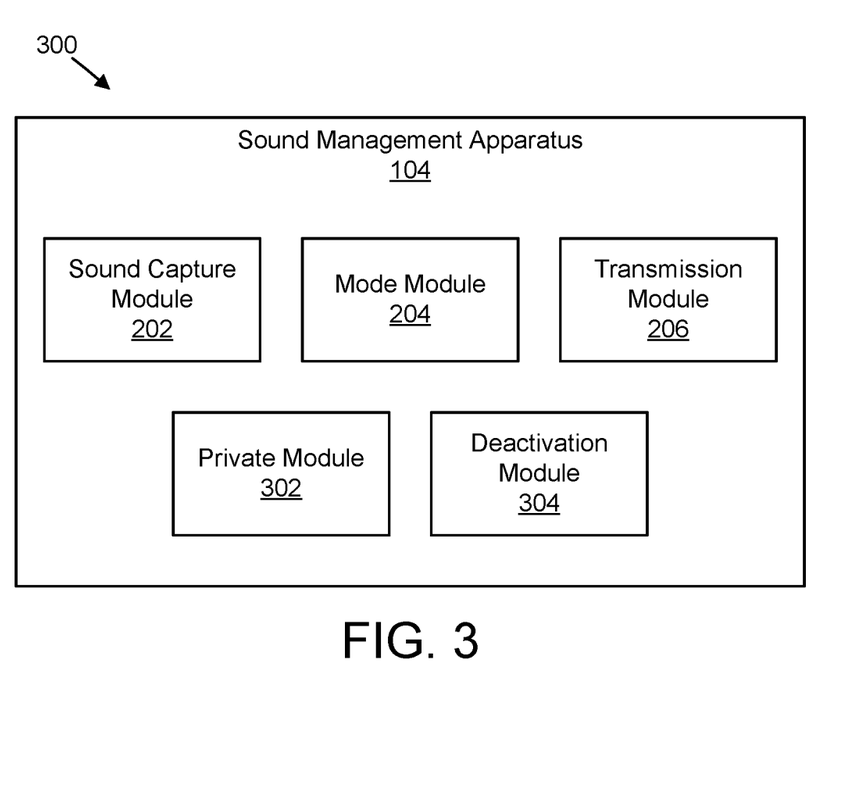
FIG. 3 is a schematic block diagram illustrating another embodiment of an apparatus for a face mask for facilitating conversations.

FIG. 3 depicts a schematic block diagram illustrating one embodiment of an apparatus 300 for a face mask for facilitating conversations. In one embodiment, the apparatus 300 includes an instance of a sound management apparatus 104. The sound management apparatus 104, in one embodiment, includes one or more of a sound capture module 202, a mode module 204, and a transmission module 206, which may be substantially similar to the sound capture module 202, the mode module 204, and the transmission module 206 described above with reference to FIG. 2. In further embodiments, the sound management apparatus 104 includes one or more of a private module 302 and a deactivation module 304, which are described in more detail below.

The private module 302, in one embodiment, is configured to output noise cancelling sounds from the speaker 118 in response to the face mask 101 being in a private mode. To add an additional layer of security and privacy (in addition to the soundproof material that the face mask 101 is made of), while the face mask 101 is in a private mode where the audio captured from within the face mask 101 is transmitted to the electronic device 102, the private module 302 triggers, generates, creates, and/or the like noise-cancelling sounds to be output by the speaker 118 so that people around the user cannot hear what the user is saying.

The private module 302, for instance, may create noise cancelling sounds by generating a sound wave that the speaker emits that has the same amplitude, but an inverted phase as the original sound, e.g., the user's voice. In such an embodiment, if the sounds waves overlap outside of the face mask 101, then the sound waves would effectively cancel each other out. One of skill in the art would recognize other methods for generating noise cancelling sounds.

In certain embodiments, the private module 302 uses the sensors 120 located on the outer surface of the face mask 101 to determine if there are people within a proximity of the user, e.g., people around a device that the user is giving voice commands to or people besides a person who is the intended target of the conversation. The private module 302 may use environment data that the sensors 120 capture, e.g., proximity data, motion data, and/or the like, to determine how many other people are around the user, distances to each person, and/or the like, and may set privacy settings based on the environment data such as a volume of the speaker, a type/level of the noise cancelling sounds, and/or the like.

The deactivation module 304, in one embodiment, is configured to deactivate the speaker 118 in response to detecting no people with a proximity of the face mask 101. The deactivation module 304 may use environmental data captured using the sensors 120 that are located on the outer surface of the face mask 101 to determine if there are people within a sensing proximity of the face mask 101, e.g., a speaking distance. The sensors 120 may include proximity sensors, motion sensors, and/or the like. If there is no one within speaking distance of the user, then the deactivation module 304 may deactivate the speaker to conserve battery life, or the like.

Similarly, the deactivation module 304 may activate the speaker 118 if the face mask 101 is in public mode and the deactivation module 304 detects the presence of at least one person or device, e.g., a smart speaker such as an Alexa-enabled device, within a proximity of the face mask 101 based on input from the sensors 120 located on the outer surface of the face mask 101. In this manner, the speaker 118 is not always enabled but is enabled and disabled as the sensors 120 detect users or devices within a proximity of the face mask 101.

The deactivation module 304, in further embodiments, uses environmental data captured using the sensor 122 that are located on the inner surface of the face mask 101 to determine if the user is wearing the face mask 101. The sensors 122 may include proximity sensors, motion sensors, or the like. If the deactivation module 304 determines that the user is not wearing the face mask 101, the deactivation module 304 automatically deactivates the components of the face mask 101, e.g., the processor 107, memory 108, microphone 103, or the like, to conserve battery life because the face mask 101 is not currently in use.

Similarly, the deactivation module 304 may activate the components of the face mask 101, e.g., the processor 107, memory 108, microphone 103, or the like in response to determining that the face mask 101 is being worn, which is based on input captured by the sensors 122, e.g., proximity sensors, motion sensors, or the like, on the inner surface of the face mask 101. In this manner, the components of the face mask 101 are not always on but are enabled and disabled as the user puts on and takes off the face mask 101.

Figure 4:
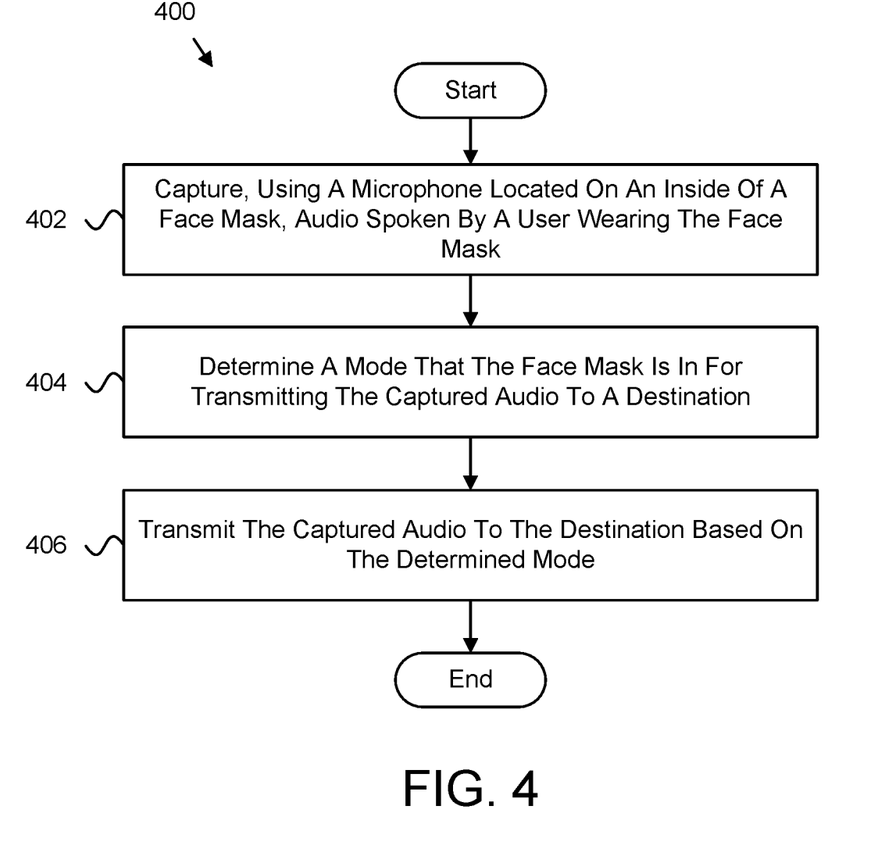
FIG. 4 is a schematic flowchart diagram illustrating one embodiment of a method for a face mask for facilitating conversations.

FIG. 4 depicts a schematic flow chart diagram illustrating one embodiment of a method 400 for a face mask 101 for facilitating conversations. In one embodiment, the method 400 begins and captures 402, using a microphone 103, audio spoken by a user wearing the face mask 101. In further embodiments, the method 400 determines 404 a mode that the face mask 101 is in for transmitting the captured audio to a destination.

In certain embodiments, the method 400 transmits 406 the captured audio to the destination based on the determined mode, and the method 400 ends. In one embodiment, the sound capture module 202, the mode module 204, and the transmission module 206 perform the various steps of the method 400.

Figure 5:
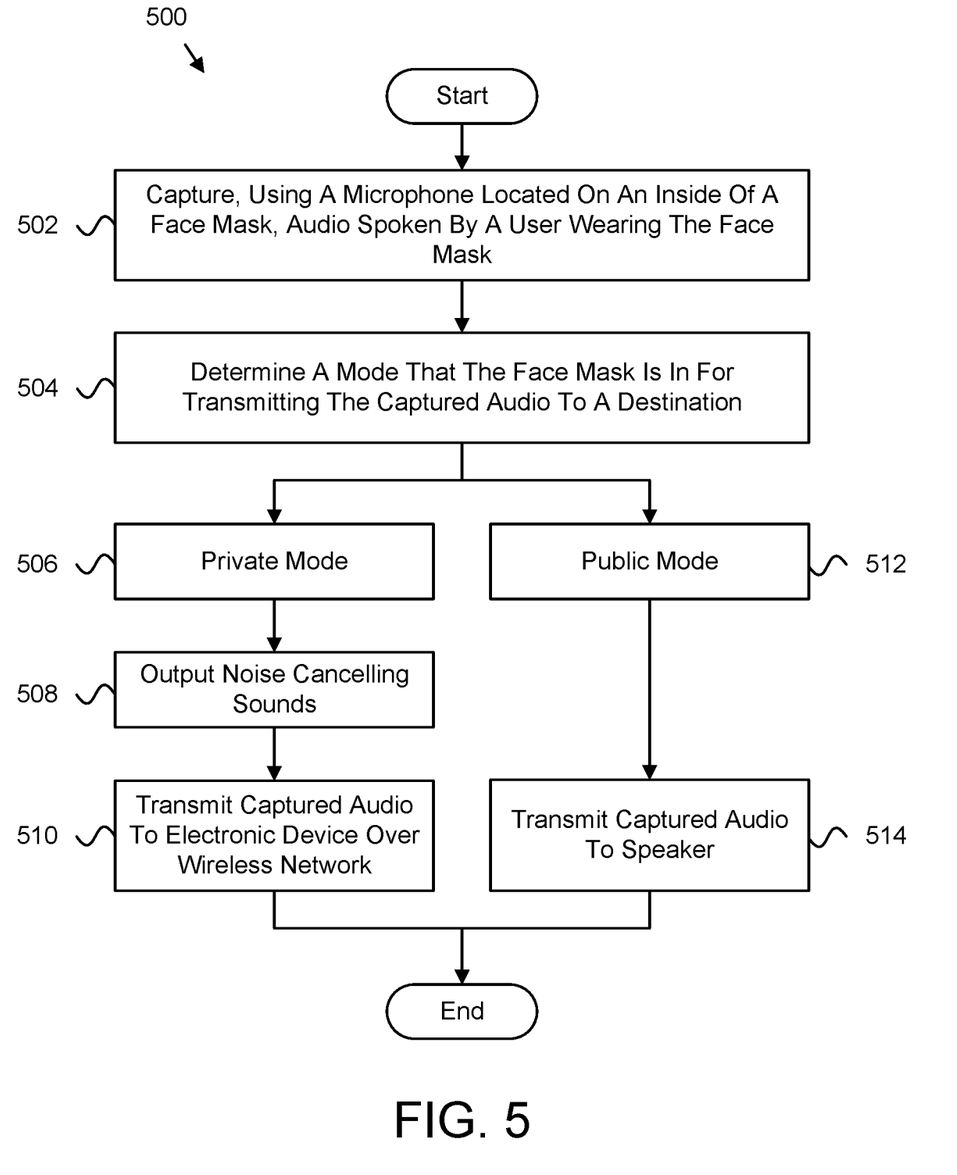
FIG. 5 is a schematic flow chart diagram illustrating another embodiment of a method for a face mask for facilitating conversations.

FIG. 5 depicts a schematic flow chart diagram illustrating one embodiment of a method 500 for a face mask 101 for facilitating conversations. In one embodiment, the method 500 begins, and captures 502, using a microphone 103, audio spoken by a user wearing the face mask 101. In further embodiments, the method 500 determines 504 a mode that the face mask 101 is in for transmitting the captured audio to a destination.

In one embodiment, if the method 500 determines that the face mask 101 is in private mode 506, the method 500 outputs 508 noise cancelling sounds and transmits 510 the captured audio to an electronic device over a short-range wireless network, e.g., Bluetooth®, and the method 500 ends.

In further embodiments, if the method 500 determines that the face mask 101 is in public mode 512, the method 500 transmits 514 the captured audio to a speaker 118, and the method 500 ends. In one embodiment, the sound capture module 202, the mode module 204, the transmission module 206, and the private module 302 perform the various steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A face mask, comprising:
a microphone located on an inside of the face mask;
a speaker located on an outer surface of the face mask;
a processor located on the inside of the face mask and connected to the microphone and the speaker; and
a memory located on the inside of the face mask, the memory storing code executable by the processor to:
capture, using the microphone, audio spoken by a user wearing the face mask;
determine that the face mask is in a private mode for transmitting the captured audio in response to detecting that the face mask is communicatively connected to an external communication device over a short-range wireless communication network;
enable the speaker to output noise cancelling sounds in response to the face mask being in the private mode;
transmit the captured audio to the external communication device for output via the external communication device;
switch the mode for the face mask to a public mode in response to the face mask being disconnected form the external communication device; and
transmit the captured audio to the speaker for output from the speaker.

2. The face mask of claim 1, further comprising a wireless network component that is operably coupled to the processor.

3. The face mask of claim 2, wherein the short-range wireless communication network comprising a communication protocol selected from the group consisting of Bluetooth®, near-field communication, and Wi-Fi.

4. The face mask of claim 1, wherein the code executable by the processor to cause the speaker to output the audio captured from the user in response to the face mask being in a public mode.

5. The face mask of claim 1, further comprising one or more sensors on the outer surface of the face mask for detecting one or more people within a proximity of the face mask, the code executable by the processor to deactivate the speaker in response to detecting no people within the proximity of the face mask and to activate the speaker in response to detecting at least one person within the proximity of the face mask.

6. The face mask of claim 1, further comprising a physical switch for changing the mode of the face mask between a private mode, a public mode, and an on/off mode.

7. The face mask of claim 1, wherein the face mask is made of a soundproof material so that audio spoken by the user while wearing the mask is not audible external to the mask.

8. The face mask of claim 1, further comprising one or more proximity sensors located on the inside of the face mask, the code executable by the processor to deactivate the processor in response to detecting that the user is not wearing the face mask based on input from the one or more proximity sensors and to activate the processor in response to detecting that the user is wearing the face mask.

9. A method, comprising:
capturing, using a microphone located on an inside of a face mask, audio spoken by a user wearing the face mask;
determining that the face mask is in a private mode for transmitting the captured audio in response to detecting that the face mask is communicatively connected to an external communication device over a short-range wireless communication network;
enabling a speaker located on an outer surface of the face mask to output noise cancelling sounds in response to the face mask being in the private mode;
transmitting the captured audio to the external communication device for output via the external communication device;
switching the mode for the face mask to a public mode in response to the face mask being disconnected form the external communication device; and
transmitting the captured audio to the speaker for output from the speaker.

10. The method of claim 9, further comprising:
deactivating the speaker in response to detecting no people within a proximity of the face mask based on input captured from one or more sensors located on the outer surface of the face mask; and
activating the speaker in response to detecting at least one person within the proximity of the face mask based on input captured from the one or more sensors located on the outer surface of the face mask.

11. The method of claim 9, wherein the captured audio transmitted to the speaker in response to the face mask being in a public mode.

12. The method of claim 9, further comprising:
deactivating the processor in response to detecting that the user is not wearing the face mask based on input from one or more proximity sensors located inside the mask; and
activating the processor in response to detecting that the user is wearing the face mask based on input from the one or more proximity sensors located inside the mask.

13. A system, comprising:
a face mask, comprising:
a microphone located on an inside of the face mask;
a speaker located on an outer surface of the face mask;
a processor connected to the microphone and the speaker; and
a memory that stores code executable by the processor to:
capture, using the microphone, audio spoken by a user wearing the face mask;
determine a mode that the face mask is in for transmitting the captured audio to a destination; and
transmit the captured audio to the destination based on the determined mode; and an application executing on an electronic device, the electronic device communicatively coupled to the face mask, the application operable to control one or more settings of the face mask.

14. The system of claim 13, wherein the code is executable by the processor to cause the speaker to output noise cancelling sounds in response to the face mask being in a private mode.

15. The system of claim 14, wherein the face mask further comprises a wireless network component that is operably coupled to the processor and in communication with the electronic device, wherein the destination for the captured audio is the electronic device, the code executable by the processor to transmit the captured audio to the electronic device over a data network in response to the face mask being in the private mode.

16. The system of claim 13, wherein the one or more settings comprises one or more of a mode of the mask, a volume of the speaker, and a sensitivity of the microphone.

17. The system of claim 13, further comprising one or more sensors on the outer surface of the face mask for detecting one or more people within a proximity of the face mask, the code executable by the processor to deactivate the speaker in response to detecting no people within the proximity of the face mask and to activate the speaker in response to detecting at least one person within the proximity of the face mask.

18. The system of claim 13, further comprising a physical switch for changing the mode of the face mask between a private mode, a public mode, and an on/off mode.

19. The system of claim 13, further comprising one or more proximity sensors located on the inside of the face mask, the code executable by the processor to deactivate the processor in response to detecting that the user is not wearing the face mask based on input from the one or more proximity sensors and to activate the processor in response to detecting that the user is wearing the face mask.

20. The system of claim 13, wherein the face mask is made of a soundproof material so that audio spoken by the user while wearing the mask is not audible external to the mask.

* * * * *